United States Patent Office 3,005,345
Patented Oct. 24, 1961

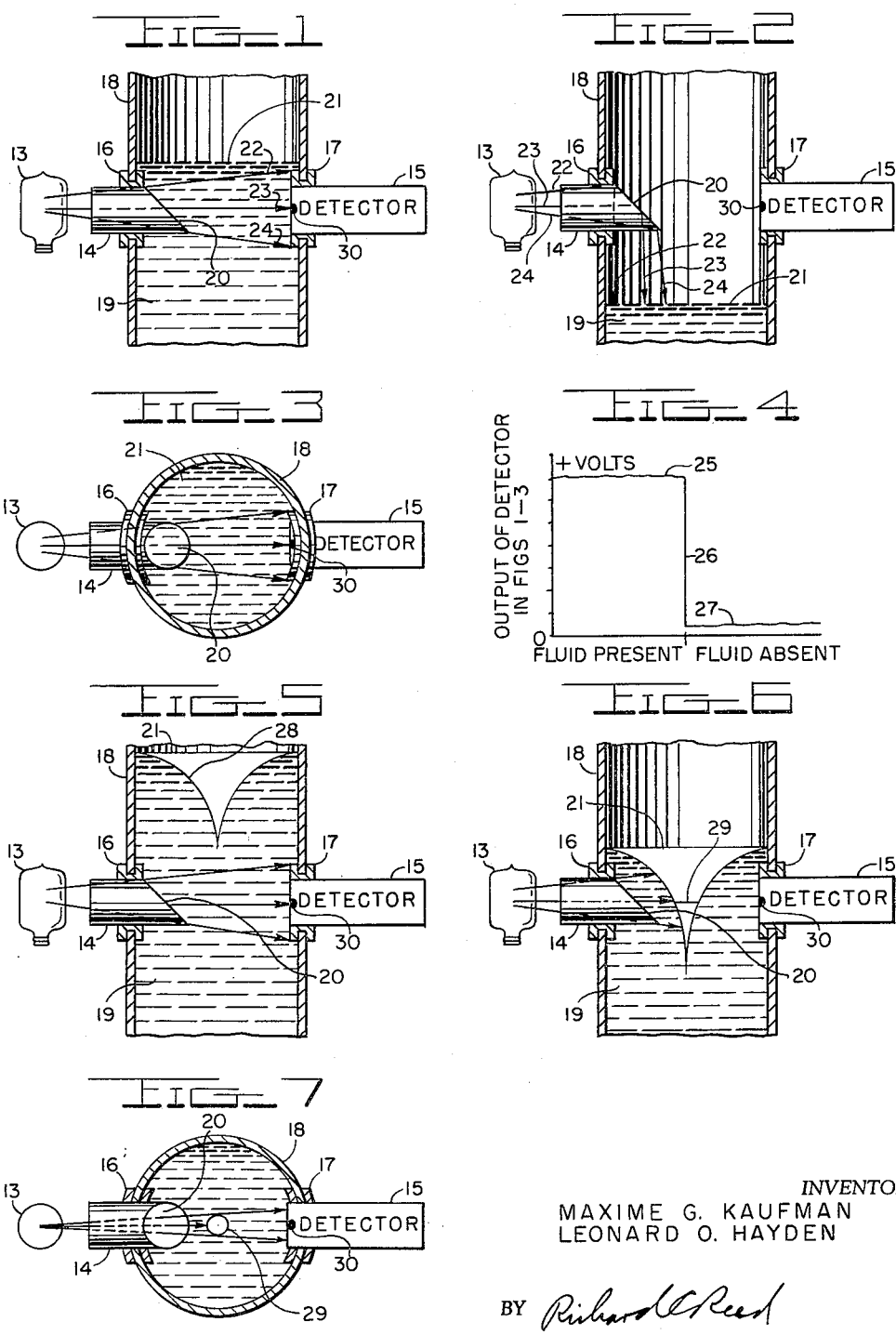

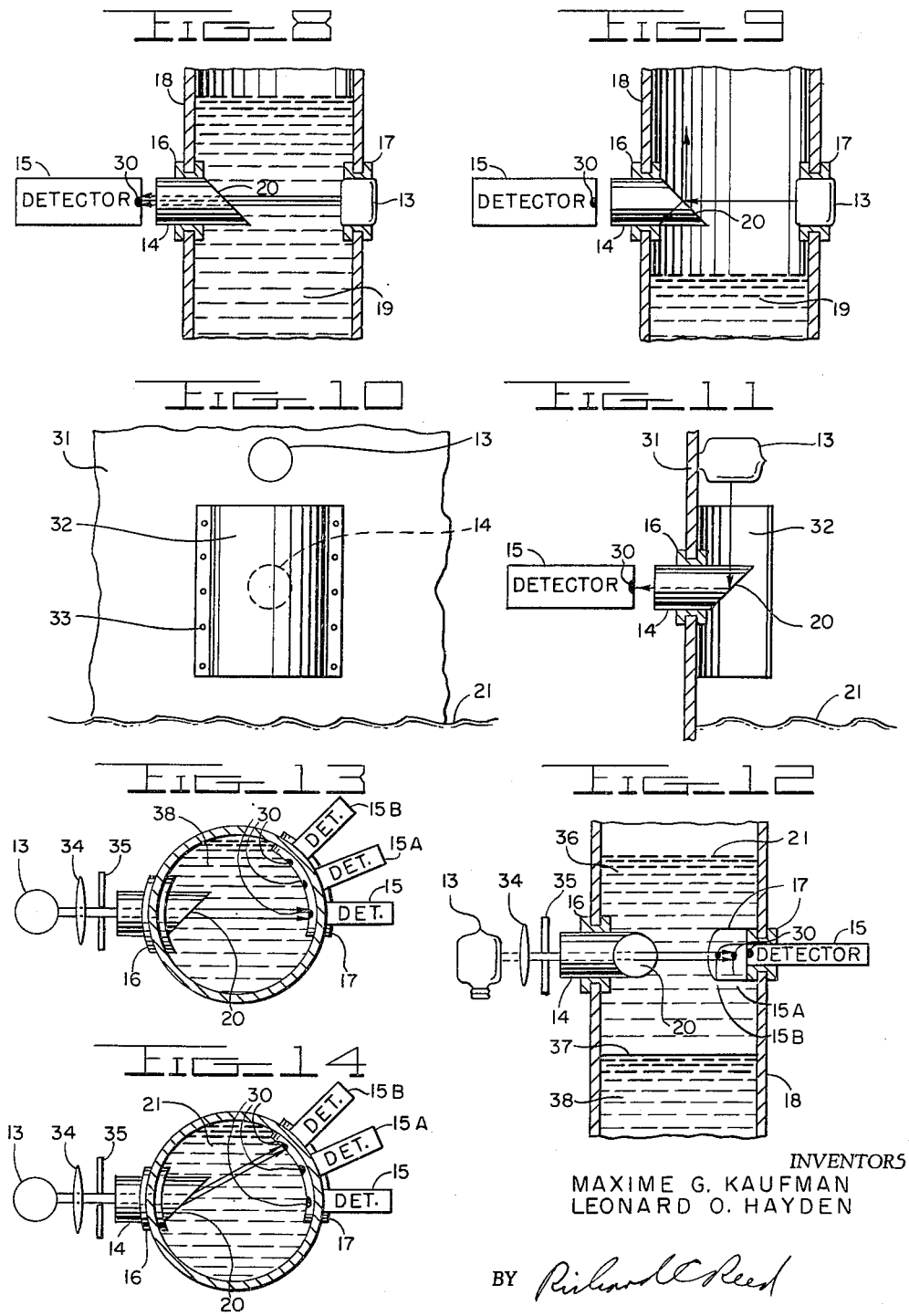

3,005,345
FLUID LEVEL INDICATOR
Maxime G. Kaufman, Camp Springs, Md., and Leonard O. Hayden, Washington, D.C., assignors to the United States of America as represented by the Secretary of the Navy
Filed May 1, 1959, Ser. No. 810,515
1 Claim. (Cl. 73—327)
(Granted under Title 35, U.S. Code (1952), sec. 266)

The invention described herein may be manufactured and used by or for the Government of the United States of America for governmental purposes without the payment of any royalties thereon or therefor.

This invention relates to fluid level indicators and, more particularly, to indicators of the level of transparent fluids.

In the development of rockets, it has become apparent that a reliable instantaneous indication of the level of fuel be provided so as to enable the rocket to burn the maximum amount of its fuel to attain its maximum velocity and to leave unburnt a critical minimum amount of fuel which is required for other rocketry purposes. Prior means of determining this critical fuel level included means such as resistive elements in the fuel which were subject to corrosive effects, being wetted, and other undesirable side elects, to reduce the reliability and accuracy beyond the tolerances of successful operation. The prior art is lacking in the rapid indication of: the passing of a fluid by a particular point, the moment of the attainment of a critical minimum of the quantity of a fluid available, the identity of a fluid at a particular point, the degree of transparency of a fluid, the index of refraction of the fluid, the turbulence within the fluid as well as other inhomogenieties such as bubbling, vortices and foreign matter, and the like. Also lacking in the prior art is the capability to have predicted thereof the time increment between an actual event and the indication of the event, the prior indicators lacked self checking capabilities to determine failure of the indicator components as opposed to an indication of an event, and also lacked the advance notice of "emptying" while impeding the flow of the fluid by the bulkiness of the structure required.

It will be appreciated that progress in the instant field has been delayed by the above listed deficiencies and that a simple means for overcoming these deficiencies would be welcomed as a substantial advancement of the art.

It is, therefore, an object of this invention to provide a fluid level indicator which reveals the presence of a transparent fluid.

Another object of this invention is to provide a fluid level indicator which instantaneously reveals that a fluid is no longer at a particular point in a confining body.

Still another object of the invention is to provide reliable indication of the moment a fluid is reduced to a critical minimum quantity.

A further object of this invention is to reliably reveal which of a plurality of transparent fluids is present at the indicator.

A still further object of this invention is to provide a fluid level indicator which will reveal the degree of transparency of a fluid.

Another object of this invention is to provide a fluid level indicator which provides an advance indication of "emptying" of a fluid by revealing inhomogenieties in the fluid, such as turbulence, bubbles and vortices.

Still another object is to indicate the presence of foreign matter in a fluid.

A further object is to provide a reliable, instantaneous indication of the fuel level in a rocket within the tolerance of successful operation.

A till further object is to provide a fluid level indicator which indicates the index of refraction of a fluid.

Another object of this invention is to provide a fluid level indicator for which the repeatability of response is predictably constant; that is, the time interval between an event and the indication of the event is substantially constant in repeated operations.

Still another object is to provide a fluid level indicator which is self checking.

The exact nature of this invention as well as other objects and advantages thereof will be readily apparent from consideration of the following description relating to the annexed drawings in which:

FIG. 1 shows an embodiment of the invention.
FIG. 2 shows the embodiment of FIG. 1 in a second stage of operativeness.
FIG. 3 shows the embodiment of FIG. 1 as seen from the top of body 18 as shown in FIG. 1.
FIG. 4 is a graphic representation of the output of the detector in FIGS. 1 through 3.
FIGS. 5, 6 and 7 show the structure of FIGS. 1, 2 and 3, respectively, with a vortex in the fluid.
FIGS. 8 and 9 show an embodiment differing from the embodiment of FIG. 1 by a rearrangement of elements.
FIGS. 10 and 11 show the invention when incorporated in a floating object.
FIGS. 12, 13 and 14 show another embodiment of this invention whereby the classification of a plurality of different fluids by indices of refraction is accomplished.

Briefly, this invention includes a light source, an optical element with a truncated end, which protrudes within a body in which a fluid is confined, and a light detector means. The light source, the optical element and the detector are aligned so that the light rays from the light source are directed through the optical element. The direction of the light rays emerging from the optical element is dependent upon the index of refraction of the fluid with which the truncated end is in contact. The detector is positioned so as to be in the path of the light rays when a selected fluid is in contact with the truncated end and to be out of the path of the light rays when this fluid is not in contact with the truncated end. The light rays are similarly changed in direction when the fluid is followed by a second fluid at the detector assembly.

The principles relied upon in the operation of the fluid level indicator of this invention include the law of refraction, commonly known as Snell's law, and the law of total internal reflection. The law of refraction has been defined: the ratio of the sines of the angles of incidence and refraction is constant for all incidences in any given pair of media for waves of a definite frequency. The two media employed are an optical element and a fluid. The position of a detector is selected so that the light from a source will fall upon the detector when the fluid is in contact with the optical element. If there is only one fluid in the body other than air, the passing of the fluid below the optical element will enable the air to be in contact with the optical element. Then the law of total internal reflection is followed to render the truncated end of the optical element to become totally reflective and the light rays from the light source are no longer applied directly to the detector.

Referring now to the drawings, wherein like reference characters designate like or corresponding parts throughout the figures, there is shown in FIG. 1, a fluid level indicating structure which includes a light source 13, an optical element 14 with its truncated end 20 and a detector 15 with its light sensitive element 30. A bushing 17 is provided whereby detector 15 is mounted within a body 18. Also within body 18 is a fluid 19 with its upper surface designated as 21. The surface 21 is shown as being above the indicating apparatus of this invention in the body 18. The light source 13, the optical element 14 and the detector 15 are optically aligned so that the cone of light indicated by the extreme rays thereof 22 and 24 will include therebetween light energy which will be detected by the light sensitive element of the detector 15.

FIG. 2 shows the structure of FIG. 1 with the fluid 19 within the tube 18 lowered such that the surface 21 is below the fluid level indicating structure. It is to be noted that the cone of light that passes from the light source 13 into the optical element 14 is now directed down the tube and that no light is available on the light sensitive means of the detector 15.

FIG. 3 shows the alignment of the light source 13, the optical element 14 and the detector 15 as viewed along the tube 18.

It is noted that body 18 is illustrated as being a circular tube. This invention could be attached to a body of any configuration which is capable of confiining a liquid. Also, the optical element 14 which is shown as a rod could well be square in cross-section and, instead of the oval shaped truncation 20, other configurations could be provided within the scope of this invention. The optical element can be of Pyrex glass, Lucite, or like material which is transparent, withstands shock and stress and is not corroded by the fluid. The optical element extends into the body 18 only so far as to provide the required optical alignment. The particular configuration of the optical element 14 is immaterial so long as the light can be transmitted thereby to the detector in a circumstance of presence of fluid and the light will be directed away from the detector in the circumstance of the absence of a fluid within the body 18. The bushings 16 and 17 are shown symbolically and can be modified in any known way to provide the proper seals required.

The light source 13 can be mounted on the outside of the body 18 by a conventionl bracket or any other means that would provide the required alignment. The light source 13 can be a steady beam in transparency determining applications, for example, or a modulated light source can be applied thereby to produce an alternating current output from the detector. The light source can provide infra red frequencies as well as visible frequencies. The detector 15 is a photoelectric device which is sensitive to the light source. The part of the detector which is exposed to the fluid is of non-corrosive material, and is mounted to be flush with the wall of body 18.

FIG. 4 shows the output of the detector in FIGS. 1 through 3 when the light source 13 is of the type that provides a steady beam. The zero indicates the absence of a voltage output from the detector. It is to be noted that in the case where fluid is present, the detector 15 provides an output 25 of a very large magnitude with respect to the output 27 of the detector 15 which occurs when the fluid is absent. The transition 26 from a high output to a low output is shown as being an abrupt change caused by the instantaneous response of the detector to the rapid change of direction of the light energy when the fluid passes by the truncated surface 20 of the optical element 14.

In FIG. 5 the fluid has a vortex 28 which progresses down the body 18 ahead of the uppermost level 21 of fluid 19.

In FIG. 6 the vortex is shown interrupting the light beam from the light source 13. The surface of the vortex is reflective and a marked reduction in the amount of light gets to the detector 15. After the vortex and the upper surface 21 have passed the optical means 14 the light beams will behave as shown in FIG. 2.

FIG. 7 shows the structure of FIG. 6, as viewed from above, with the vortex interrupting the light rays. The circle 29 is shown as a section of the vortex in FIG. 6.

In FIG. 8 the elements of the fluid level indicator are reversed with respect to the arrangement as shown in FIG. 1. The light source 13 is mounted so as to direct the light rays through the fluid before entering the optical element 14. The detector 15 is mounted outside of the body 18 as was light source 13 in FIG. 1.

FIG. 9 shows that when the fluid level has passed below the indicating structure, the truncated surface 20 of optical element 14 then becomes reflective and the light rays do not reach detector 15.

In FIG. 10, the fluid level indicating apparatus is shown mounted on the side 31 of a floating object, such as a ship or boat or buoy, with the light source 13 mounted so as to be directed on the optical element 14. Protection from extraneous light on the optical element 14 is provided by a shield 32 which is held to the side 31 by securing means 33. The light source 13 can be replaced by natural light.

FIG. 11 shows a sectional view of the assembly of FIG. 10 with the detector 15 being mounted inside the floating object. This embodiment utilizes the law of total reflection. It is obvious that the law of refraction can be utilized by modifying the shape of the cover plate 32 to provide the proper entry angle of the light beams.

In FIG. 12, a lens 34 and a beam narrowing means or iris 35 are provided to assure accurate operation of the indicator. In addition to detector 15, detectors 15A and 15B are added. Such detectors are disposed in the refractory path of the light beam which goes through optical element 14 into the fluid 19. A fluid 36, of greater density than air, passes through the body 18 above a second fluid 38 which is of greater density than fluid 36. The surface 37 indicates the separation of the two fluids 36 and 38. It is noted that the light from light source 13 which has passed through optical element 14 is centered on detector 15A to indicate that the medium density fluid is at this time at the indicator level.

In FIG. 13 which is a view of the apparatus of FIG. 12 from above, the densest fluid 38 is at the indicator level, and the light rays thereof proceed to be focused on detector 15.

In FIG. 14, the two fluids 36 and 38 have passed below the detector level and the focusing of the refracted rays on detector 15B indicates that there is no longer any fluid at the indicating level, other than air.

This is the provision whereby the positive self-checking is accomplished. An output from detector 15B reveals that the indicator is working properly.

The operation of the apparatus of this invention is such that the aligned light source 13, optical element 14 and detector 15 provide an output signal, such as 25 in FIG. 4, while a fluid is present in the body 18 and an output signal such as 27 when the fluid has passed the aligned indicating means. The reverse response of the detector is obviously apparent in applications where the direction of fluid flow is reversed. A reverse response of the detector can be chosen for the first said fluid flow direction.

The angle of the truncated surface 20 with respect to the axis of the optical element 14 can be so chosen as to produce total internal reflection in the absence of a fluid other than air. When the fluid has passed the aligned indicating means, the truncated surface 20 then becomes reflective and no longer transmits light in the direction of the detector 15 as shown in FIGS. 1 through 7, the reflected light is directed down the tube so as to minimize internal reflections which might arrive at detector 15 to provide an error signal thereby. FIGS. 1 and 3 show that the cone of light bounded by the rays 22 and 24 is centered on the light sensitive element 30 on the detector 15 to indicate that the detector is receiving a light signal. The level of the fluid 19 is the same for FIG. 1 and FIG. 3.

FIG. 2 shows that the light cone, indicated by the extreme rays 22 and 24, is directed away from detector 15 when the fluid has passed by the indicator. In FIGS. 5 through 7, the operation of the apparatus is the same as in FIG. 1 except that a vortex is shown in the fluid to reveal that this apparatus will detect a disturbance, in the form of a vortex or even bubbles or the like, when it occurs within the fluid 19. It is evident that any foreign body or any break in the transparency of the fluid would provide a discontinuity in the light beam on the detector 15. This discontinuity would provide a significant output signal such as the voltage drop 26 indicated in FIG. 4 whereby the disturbance or impurity in the fluid contained within body 18 would be indicated.

In FIGS. 8 and 9 the elements of the indicator are arranged such that the light is introduced through fluid 19 to the optical element 14 as opposed to the arrangement shown in FIG. 1. In the presence of a fluid 19, the light is transmitted through the light sensitive element of detector 15. In the absence of the fluid 19, the light is in part reflected and in part refracted at the truncated surface 20 of optical element 14.

In FIGS. 10 and 11, the reflection from the truncated surface 20 of the optical element 14 is directed to the detector 15 while the element 14 remains above the surface of the fluid 21. Should the circumstance occur that the body 31, which is a ship or a buoy, become lowered into the fluid 21 so that the optical element 14 is submerged, then the absence of a light signal on the detector 15 would provide the significant output signal. It is seen that this indicator would provide information as to the height of waves, for example, and other such nautical information, as well as to indicate the draft of the vessel. Obviously, a plurality of these indicators could be located at different levels and areas of the surface of the vessel to indicate the presence or absence of a fluid at any desired place.

The operation of the device as shown in FIGS. 12 through 14 is the same as in the prior figures except that a plurality of fluids of different densities can be individually detected thereby since the refraction of the light beam is dependent upon the density of the fluid. A plurality of detectors 15, 15A and 15B are disposed so as to coincide with the refracted beam provided by the fluid which is to be detected. The lens 34 and the beam narrowing means 35, such as an iris or a slit, are provided so that a focused beam will be concentrated upon the light sensitive element 30 of the detectors.

It is seen that this invention has provided a reliable and instantaneous indication of the level of fuel in a rocket. The amount of fuel to be indicated within very close tolerances and at a very rapid rate determines where the indicator is placed in the system, that is, just at the level which defines the quantity of the critical minimum amount of fuel not yet consumed. The structure which is exposed to the fluid to be indicated is not corroded thereby, and the elements do not extend into the fluid an appreciable amount to impede the flow of the fluid as was the case in the prior art. Since this indicator operates at the speed of light, the exact moment of the attainment of a critical quantity of fluid is obtainable. With a plurality of detecting means disposed discretely in the path of refraction of the light rays, the identity of a plurality of fluids is readily available. The strength of the signal produced by the detector provides an indication of the degree of transparency of the fluid. The indicator of this invention provides advance warning of "emptying" of a fluid by the change in the output signal when a vortex or bubbles occur at the indicator level. It is apparent that foreign matter will also produce a significant change in the output signal. Further, the time of response of the indicator folowing an event is predictable as being substantially constant. When a second detector is supplied to detect the light beam when the fluid is not present provides the self checking of the system to render all output information known to be accurate or known to be the result of failure within the indicating structure itself.

It is to be noted that if the sine of angle of refraction indicated by Snell's law is greater than 1, then total internal reflection results. In FIGS. 1 through 3, for example, the angular disposition of the truncated end 20 of optical element 14 is such that total internal reflection is provided. When the conditions for total internal reflection are not present, a smaller and useful deflection is experienced as predicted by Snell's law.

Obviously many modifications and variations of the present invention are possible in the light of the above teachings. It is therefore to be understood that within the scope of the appended claim the invention may be practiced otherwise than as specifically described.

What is claimed is:

In a fluid level indicator, an elongated container for said fluid, a light source, a detector and an optical element having a truncated end; said optical element being mounted such that the truncated portion thereof protrudes into the fluid within the container; said light source, said optical element and said detector being aligned so that the light from said light source is directed through said truncated end onto said detector when a preselected fluid is present thereat and reflected by said truncated end along said elongated container and away from said detector when such preselected fluid is absent.

References Cited in the file of this patent

FOREIGN PATENTS 515,938    Belgium _____ Dec. 31, 1952